Patented Apr. 21, 1936

2,038,074

UNITED STATES PATENT OFFICE 2,038,074

PRODUCTION OF BETA-CHLORO-ALKYL ESTERS OF ALIPHATIC ACIDS

Edgar C. Britton and Gerald H. Coleman, Midland, Mich., assignors to The Dow Chemical Company, Midland, Mich., a corporation of Michigan No Drawing. Application November 7, 1932, Serial No. 641,608

7 Claims. (Cl. 260—106)

The present invention relates to a process for the production of the beta-chloro-alkyl esters of aliphatic acids, and particularly to a process for making beta-chloro-ethyl acetate.

Briefly stated, our invention contemplates reacting an alkylene chloride with an alkali metal salt of an aliphatic acid in the presence of a suitable catalyst, introducing hydrogen chloride into the reaction mixture and separating the corresponding beta-chloro-alkyl ester of the aliphatic acid therefrom.

The invention, then, consists of the process hereinafter fully described and particularly pointed out in the claims, the following description setting forth in detail several modes of carrying out the invention, such disclosed modes illustrating however, but several of various ways in which the principle of the invention may be used.

Our invention embraces the production of the beta-chloro-alkyl ester of an aliphatic acid from an alkylene chloride by treating such chloride with the alkali metal salt of an aliphatic acid to produce the corresponding alkylene glycol di-ester of the acid, and then preparing the chloro-compound from such di-ester by treating the latter with hydrogen chloride without the necessity of first separating the di-ester from the reaction mixture. The principal reactions involved are those given below wherein R' represents an alkyl group or hydrogen, R represents an alkyl group and M represents an alkali metal:—

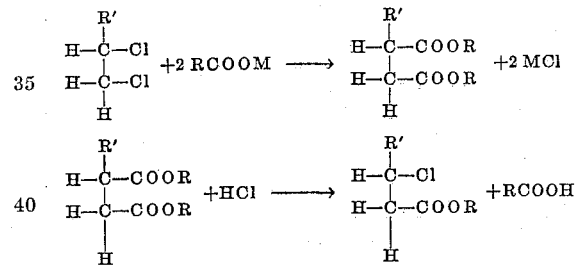

It is obvious from the foregoing that we may use the di-ester directly as a starting material in the preparation of the beta-chloro-alkyl ester, but such procedure is less economical in commercial practice since the intermediate separation of the di-ester from the reaction mixture adds to the cost of producing the beta-chloro-alkyl ester.

In preparing beta-chloro-ethyl acetate, for example, according to our improved process, an alkali metal acetate is mixed with preferably more than its chemical equivalent of ethylene chloride; a suitable catalyst is added in amount representing preferably less than one-tenth of a molecular equivalent of catalyst for each mole of acetate used; the mixture is agitated and heated under superatmospheric pressure at a temperature between about 150° and about 250° C. The reaction, when carried out at 200°–225° C., for example, is usually substantially completed after heating for about 1 to 2 hours; and in general, the time required varies inversely with the temperature, i. e. lower temperatures require longer heating, etc. The reaction mixture is then cooled to a temperature between about 30° and about 130° C. and hydrogen chloride, preferably the anhydrous gaseous acid, is added thereto in the ratio of about one-half molecular equivalent of acid for each mole of sodium acetate originally used. The addition of the hydrogen chloride may be made at atmospheric pressure, but we prefer to add the acid to the reaction mixture under at least the vapor pressure of the reactants at the temperature thereof. After all the hydrogen chloride has been passed into the reaction mixture, we have found it advantageous to raise the temperature to about 130° C. by heating under pressure, so as to insure all of the acid being completely reacted and thereby to avoid subsequent corrosion of distillation equipment due to the presence of any unreacted acid.

Catalysts suitable for the reaction of the alkylene chloride and aliphatic acid salt are either water or an amine, e. g. an alkyl amine such as ethyl amine, butyl amine, etc., or an alkanol amine, such as di- or tri-ethanol amine. In general water works very satisfactorily, and is preferred.

The following example illustrates the results obtained in carrying out the preparation of beta-chloro-ethyl acetate from ethylene chloride as a raw material.

Example 1

In a rotating iron bomb was placed 6210 grams of ethylene chloride, 3430 grams of sodium acetate and 52 grams of water. The reactants were, therefore, in the molar proportion of 1.5 moles of ethylene chloride, 1.0 mole of sodium acetate and 0.01 mole of water. The temperature of the reaction mixture was then raised to and maintained at 193°–200° C. for a period of 12 hours and the bomb rotated during this time. The mixture was then cooled and transferred to a flask provided with a reflux condenser and a glass bubbling tube. The mixture was maintained at a temperature of 30°–50° C. while 798 grams of gaseous hydrogen chloride was passed thereinto at a substantially uniform rate over a period of 6 hours. The reaction product after the addition of hydrogen chloride thereto was then transferred to a distilling flask, fractionated, and the fractions analyzed with the following results:—

From the fraction distilling over up to 85° C. 4018 grams of substantially pure ethylene chloride was recovered.

The portion distilling over between 85° and 191° C. amounted to 3458 grams and was then fractionally distilled to obtain 1625 grams of pure beta-chloro-ethyl acetate, or a yield of 63.5 per cent of theoretical based on the sodium acetate in the charge. The balance of the portion distilling over between 85° and 191° C. consisted upon analysis of:—

| | Grams |
|---|---|
| Hydrogen chloride | 18.3 |
| Acetic acid | 864.6 |
| Ethylene chlorohydrin | 148.7 |
| Glycol diacetate | 692.0 |
| Glycol | 28.4 |
| Unaccounted for (includes water) | 81.0 |

The residue from the fractionation consisted principally of sodium chloride.

In the following example is described a run employing as a raw material crude ethylene glycol diacetate which was obtained by reacting ethylene chloride and sodium acetate, distilling off unreacted ethylene chloride and the acetic acid, and then collecting the fraction distilling from the reaction mixture between 118° and 128° C. at 100 millimeters of mercury absolute pressure.

Example 2

The composition of the crude ethylene glycol diacetate was as follows:—

| | Per cent by weight |
|---|---|
| Ethylene glycol diacetate | 84.9 |
| Ethylene glycol | 9.9 |
| Acetic acid | 1.5 |
| Water | 0.2 |
| Residue | 3.5 |

The reactor was a round-bottom flask provided with a reflux condenser and glass bubbling tube. In the reactor was placed 1179 grams of the above crude ethylene glycol diacetate, and the temperature thereof maintained in the range between 30° and 50° C. while 299 grams of gaseous hydrogen chloride was passed thereinto over a period of 12 hours.

The crude reaction mixture was then fractionally distilled and the following portions obtained:—

| | Grams |
|---|---|
| β-Chloro-ethyl acetate | 926.5 |
| Ethylene glycol diacetate | 155.0 |
| Ethylene glycol | 7.5 |
| Ethylene chlorohydrin | 36.0 |
| Acetic acid | 289.5 |
| Hydrogen chloride | 15.5 |
| Unaccounted for | 48.0 |

The yield of beta-chloro-ethyl acetate based on the charge was 86.7 per cent of theoretical.

To illustrate the improved result obtained by working up the foregoing reaction product by heating the same under pressure, we will describe the treatment of the product from a run carried out substantially in the manner described in Example 2, except that in this case a slight deficiency of hydrogen chloride was used to avoid the presence of any excess acid in the final product.

Example 3

The crude beta-chloro-ethyl acetate reaction mixture prepared as in Example 2, amounting to 917.5 grams, was divided into approximately two equal parts and worked up as follows:— One part (I) was fractionally distilled, and the other part (II) was placed in a rotating copper bomb, heated to 125° C. in two hours and then maintained at that temperature for two hours more, cooled, removed from the bomb and then fractionally distilled.

| | Temp. ° C. | Part I wt.—grams | Part II wt.—grams |
|---|---|---|---|
| β-Chloro-ethyl acetate in this fraction | 100–140 | 99.0 | 175.0 |
| | 140–153 | 60.0 | 105.0 |
| | 153–184 | 25.5 | 20.0 |
| | 184–188 | 242.0 | 176.0 |
| | Residue | 8.0 | 7.0 |
| | | 434.5 | 483.0 |

It is at once to be seen that the yield of beta-chloro-ethyl acetate is greatly improved when the reaction mixture is finished off by heating under pressure at temperatures as high as about 125° C. Moreover, analysis showed that Part I contained considerable unreacted hydrogen chloride even though a deficiency thereof has been used in carrying out the reaction, while no free hydrogen chloride remained in Part II.

To illustrate the practice of our invention in the production of other beta-chloro-alkyl esters, we have carried out the process employing various alkylene chlorides and alkali metal salts of aliphatic acids as hereinafter described. The runs were conducted in substantially the same manner as described in Example 1. Propylene chloride and sodium acetate were reacted to form propylene glycol diacetate which was then treated with hydrogen chloride. The conversion of propylene glycol diacetate into beta-chloro-propyl acetate obtained was 72 per cent of theoretical. In the same manner ethylene dichloride and sodium butyrate were reacted to form ethylene glycol dibutyrate which was then treated with hydrogen chloride to produce beta-chloro-ethyl butyrate.

The present invention broadly comprises producing the beta-chloro-alkyl esters of aliphatic acids by reacting an alkali metal salt of such acid with an alkylene chloride in the presence of a suitable catalyst, e. g. water, an alkyl amine, an alkanol amine, etc., preferably with agitation of the reaction mixture, treating the foregoing reaction mixture with hydrogen chloride, and separating the beta-chloro-alkyl ester from the final product. Our invention includes the production of beta-chloro-alkyl esters from alkylene glycol di-esters derived from any source. We have also found that the residual glycol di-ester recovered from the final reaction product after the hydrogen chloride treatment is obtained having a higher degree of purity than that obtained from the intermediate reaction mixture. We have thereby determined that glycol di-esters may be prepared in a purified form coincidentally with the preparation of beta-chloro-alkyl esters when the usual impure form of the material is treated with hydrogen chloride in amount less than required to convert the di-ester completely to the corresponding beta-chloro-alkyl ester.

Other modes of applying the principle of our invention may be employed instead of those explained, change being made as regards the process herein disclosed, provided the step or steps stated by any of the following claims or the equivalent of such stated step or steps be employed.

We therefore particularly point out and distinctly claim as our invention:—

1. The process for making beta-chloro-ethyl acetate which comprises reacting ethylene glycol diacetate with approximately one molecular equivalent of hydrogen chloride at a temperature between about 30° and about 130° C., heating the reaction product under pressure to a temperature of between about 90° and about 150° C., and separating beta-chloro-ethyl acetate from the final product.

2. The process for making the beta-chloro-alkyl ester of an aliphatic monocarboxylic acid which comprises reacting an alkylene chloride with an alkali metal salt of an aliphatic acid to produce an alkylene glycol di-ester, then treating the reaction mixture with approximately one-half molecular equivalent of hydrogen chloride based on the alkali metal salt, and separating the beta-chloro-alkyl ester of the aliphatic acid from the final product.

3. The process for making beta-chloro-ethyl acetate which comprises reacting ethylene chloride with an alkali metal acetate in the presence of a catalyst to produce ethylene glycol di-acetate, treating the reaction mixture with approximately one-half molecular equivalent of hydrogen chloride based on the alkali metal acetate, and separating beta-chloro-ethyl acetate from the final product.

4. The process for making beta-chloro-ethyl acetate which comprises reacting ethylene chloride with sodium acetate under superatmospheric pressure at a temperature between about 150° and about 200° C. in the presence of a catalytic amount of water to produce ethylene glycol di-acetate, treating the reaction mixture with approximately one-half molecular equivalent of hydrogen chloride based on the sodium acetate at a temperature between about 30° and about 130° C., and separating beta-chloro-ethyl acetate from the final product.

5. The process for the production of beta-chlor-ethyl acetate which comprises reacting ethylene chloride with sodium acetate under superatmospheric pressure at a temperature between about 150° and about 200° C. in the presence of a catalytic amount of water to produce ethylene glycol di-acetate, treating the reaction mixture with approximately one-half molecular equivalent of hydrogen chloride based on the sodium acetate at a temperature between about 30° and about 130° C., heating the product under pressure to a temperature between about 90° and about 150° C., and separating beta-chloro-ethyl acetate therefrom.

6. In a process for the production of the beta-chloro-alkyl esters of aliphatic mono-carboxylic acids from glycol di-esters of an aliphatic mono-carboxylic acid by treatment with hydrogen chloride, the step which consists in treating the impure form of such di-esters with less hydrogen chloride than will completely react therewith at a temperature between about 30° and about 130° C. and separating the purified di-ester from the reaction mixture.

7. The process for making the beta-chloro-alkyl ester of an aliphatic mono-carboxylic acid which comprises reacting an aliphatic mono-carboxylic acid di-ester of an alkylene glycol with approximately one molecular equivalent of hydrogen chloride at a temperature between about 30° and about 130° C., heating the reaction product under pressure to a temperature of between about 90° and about 150° C., and separating the beta-chloro-alkyl ester from the final product.

EDGAR C. BRITTON.
GERALD H. COLEMAN.